United States Patent
Stanga et al.

(10) Patent No.: US 8,476,356 B2
(45) Date of Patent: Jul. 2, 2013

(54) (PER)FLUOROELASTOMERIC COMPOSITIONS

(75) Inventors: Milena Stanga, Origgio (IT); Giovanni Comino, Monza (IT); Stefano Arrigoni, Cesate (IT); Margherita Albano, Milan (IT)

(73) Assignee: Solvay Solexis S.p.A., Milan (IT)

( * ) Notice: Subject to any disclaimer, the term of this patent is extended or adjusted under 35 U.S.C. 154(b) by 879 days.

(21) Appl. No.: 12/307,224

(22) PCT Filed: Jun. 28, 2007

(86) PCT No.: PCT/EP2007/056480
§ 371 (c)(1),
(2), (4) Date: Nov. 4, 2009

(87) PCT Pub. No.: WO2008/003636
PCT Pub. Date: Jan. 10, 2008

(65) Prior Publication Data
US 2010/0069558 A1 Mar. 18, 2010

(30) Foreign Application Priority Data
Jul. 3, 2006 (IT) ................ MI2006A1292

(51) Int. Cl.
*C08K 5/04* (2006.01)
(52) U.S. Cl.
USPC ......... 524/495; 524/544; 525/326.2; 525/387
(58) Field of Classification Search
USPC ............. 524/495, 544; 525/326.2, 387
See application file for complete search history.

(56) References Cited

U.S. PATENT DOCUMENTS

| 4,434,275 | A | | 2/1984 | Longfield | |
|---|---|---|---|---|---|
| 5,187,222 | A | * | 2/1993 | Abe et al. | 524/492 |
| 6,642,331 | B2 | * | 11/2003 | Apostolo et al. | 526/247 |
| 6,710,132 | B2 | * | 3/2004 | Apostolo et al. | 525/199 |
| 6,803,402 | B2 | * | 10/2004 | Higashino et al. | 524/430 |
| 7,488,787 | B2 | * | 2/2009 | Apostolo et al. | 526/247 |
| 7,514,512 | B2 | * | 4/2009 | Apostolo et al. | 526/247 |
| 2003/0088040 | A1 | * | 5/2003 | Arrigoni et al. | 526/255 |
| 2005/0282969 | A1 | * | 12/2005 | Comino et al. | 525/326.2 |

FOREIGN PATENT DOCUMENTS

| EP | 1304341 | A2 * | 4/2003 |
| EP | 1308467 | A2 * | 5/2003 |
| WO | WO 95/22575 | A | 8/1995 |

* cited by examiner

*Primary Examiner* — Peter D. Mulcahy
*Assistant Examiner* — Henry Hu
(74) *Attorney, Agent, or Firm* — Arent Fox LLP

(57) ABSTRACT

A (per)fluoroelastomeric composition curable by peroxidic way comprising for 100 phr of (per)fluoroelastomer:
as filler, from 2 to 70 phr of carbon black having a surface area between 25 and 35 m²/g;
as crosslinking agent, from 0.5 to 10 phr of a bis-olefin having general formula:

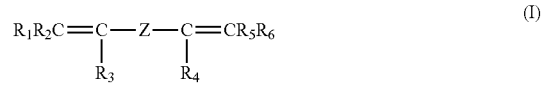

wherein:
$R_1, R_2, R_3, R_4, R_5, R_6$, equal to or different from each other, are H or $C_1$-$C_5$ alkyls;
Z is selected between a linear or branched $C_1$-$C_{18}$ alkylene or cycloalkylene radical, optionally containing oxygen atoms, preferably at least partially fluorinated, or a (per)fluoropolyoxyalkylene radical.

25 Claims, No Drawings

(PER)FLUOROELASTOMERIC COMPOSITIONS

CROSS-REFERENCE TO RELATED APPLICATION

This application is a National Stage entry of International Application No. PCT/EP2007/056480, filed Jun. 28, 2007, which claims priority to Italian Application No. MI2006A001292, filed Jul. 3, 2006, the disclosure of the prior applications is hereby incorporated in their entirety by reference.

The present invention relates to (per)fluoroelastomeric compositions having an improved vapour resistance at high temperatures, for example from 230° C. to 320° C., in particular from 250° C. to 300° C. With vapour resistance it is meant the combination of good sealing properties (compression set) and low variations of the mechanical properties, after vapour treatment at the above mentioned high temperatures. Said combination of properties is maintained even for long treatment times, for example even higher than 150 hours.

More specifically the invention refers to (per)fluoroelastomeric compositions which maintain good mechanical properties, as pointed out from the variation of mechanical properties as stress at break, elongation at break, hardness and swelling by volume, even after long times of vapour treatment at the above mentioned high temperatures.

In the preparation of sealing manufactured articles, in particular for the chemical and oil industry, (per)fluoroelastomeric compositions having a high vapour resistance at high temperatures, for example up to 320° C., preferably up to 300° C. are required, that is, maintaining good mechanical and sealing properties even after vapour treatment at the above indicated temperatures, also for long times.

It has been surprisingly and unexpectedly found by the Applicant that it is possible to solve the above mentioned technical problem by using a particular (per)fluoroelastomeric composition, as described below.

An object of the present invention is the use for preparing manufactured articles having vapour resistance at high temperatures, for example from 230° C. to 320° C., in particular from 250° C. to 300° C., of (per)fluoroelastomeric compositions curable by peroxidic way comprising for 100 phr of (per)fluoroelastomer:
- as filler, from 2 to 70 phr of carbon black having a surface area CTAB (ASTM D 3765) between 25 and 35 m$^2$/g;
- as crosslinking agent, from 0.5 to 10 phr of a bis-olefin having general formula:

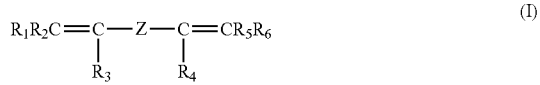

wherein:
$R_1, R_2, R_3, R_4, R_5, R_6$, equal to or different from each other, are H or $C_1$-$C_5$ alkyls;
Z is selected between a linear or branched $C_1$-$C_{18}$ alkylene or cycloalkylene radical, optionally containing oxygen atoms, preferably at least partially fluorinated, or a (per)fluoropolyoxyalkylene radical.

The filler can vary from 5 to 50 phr, preferably from 10 to 40 phr.

The bis-olefin amount ranges from 0.6 to 5 phr, preferably from 0.6 to 1.80 phr, still more preferably from 0.9 to 1.5 phr.

The carbon black having surface area CTAB within the above mentioned limits is commercially known. For example Carbon black Corax® N772 and Corax® N774 can be mentioned.

In formula (I) of the bis-olefin, Z is preferably a $C_4$-$C_{12}$, more preferably $C_4$-$C_8$, perfluoroalkylene radical; when Z is a (per)fluoropolyoxyalkylene radical, it can comprise units selected from the following:

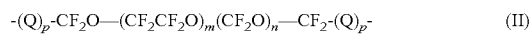 wherein $X_1$=F, $CF_3$,
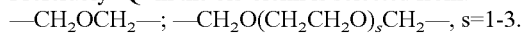

while $R_1, R_2, R_3, R_4, R_5, R_6$ are preferably hydrogen.

Preferably Z has formula:

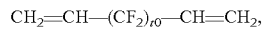 (II)

wherein: Q is a $C_1$-$C_{10}$ alkylene or oxyalkylene radical; p is 0 or 1; m and n are numbers such that the m/n ratio is between 0.2 and 5 and the number average molecular weight of said (per)fluoropolyoxyalkylene radical is in the range 300-10,000, preferably 700-2,000.

Preferably -Q- in the bis-olefin is selected from:
—CH$_2$OCH$_2$—; —CH$_2$O(CH$_2$CH$_2$O)$_s$CH$_2$—, s=1-3.

Preferably the bis-olefin has formula:

$$CH_2=CH-(CF_2)_{t0}-CH=CH_2,$$

wherein t0 is an integer from 6 to 10.

The bis-olefins of formula (I) wherein Z is an alkylene or cycloalkylene radical can be prepared according to what described, for example, by I. L. Knunyants et al. in "Izv. Akad. Nauk. SSSR", Ser, Khim., 1964(2), 384-6, while the bis-olefins containing (per)fluoropolyoxyalkylene sequences are described in U.S. Pat. No. 3,810,874.

The (per)fluoroelastomers curable by peroxidic way with the crosslinking system according to the present invention are those containing peroxidic crosslinking sites. Preferably these sites are represented by iodine and/or bromine atoms, preferably iodine. See for example the perfluoroelastomers described in EP 769,521. The iodine and/or bromine atoms can be present along the backbone and/or as terminal end of the backbone. The amount of iodine and/or bromine is generally between 0.001% and 5% by weight, preferably between 0.01% and 2.5% by weight with respect to the total weight of the polymer. To introduce iodine atoms along the chain, the polymerization of the fluoroelastomer monomers is carried out with a suitable fluorinated comonomer containing iodine (cure-site monomers). See for example U.S. Pat. Nos. 4,745,165, 4,831,085, 4,214,060, EP 683,149. The cure-site can be selected for example from the following compounds:
(a) iodo(per)fluoroalkyl-perfluorovinylethers of formula:

$$I-R_f-O-CF=CF_2 \quad (III)$$

wherein $R_f$ is a $C_1$-$C_{12}$ (per)fluoroalkylene, optionally containing chlorine and/or ether oxygen atoms;
for example: $ICF_2$—O—CF=CF$_2$, $ICF_2CF_2$—O—CF=CF$_2$, $ICF_2CF_2CF$—O—CF=CF$_2$, $CF_3CFICF_2$—O—CF=CF$_2$, and the like;
(b) iodo-(per)fluoroolefins of formula:

 (IV)

wherein $R'_f$ is a $C_1$-$C_{12}$ (per)fluoroalkylene, optionally containing chlorine atoms;
for example: iodotrifluoroethylene, 1-iodo-2,2-difluoroethylene, iodo-3,3,4,4-tetrafluorobutene-1, 4-iodo-perfluorobutene-1, and the like;
(c) iodo-(per)fluoroolefins of formula:

 (V)

wherein: $R_o$ is H or —$CH_3$; $Z_o$ is a $C_1$-$C_{18}$ linear or branched (per)fluoroalkylene radical, optionally containing one or more oxygen atoms, or a (per)fluoropolyoxyalkylene radical as above defined.

Other iodinated cure-site comonomers are iodofluoroalkylvinylethers, see U.S. Pat. Nos. 4,745,165 and 4,564,662.

Alternatively, or in addition to the iodinated comonomer, the fluoroelastomer can contain iodine atoms in end position, deriving from a suitable iodinated chain transfer agent introduced in the reaction medium during the fluoroelastomer polymerization, as described in U.S. Pat. No. 4,501,869. Said transfer agents have formula $R^A{}_f(I)_x$, wherein $R^A{}_f$ is a $C_1$-$C_{12}$ (per)fluoroalkyl radical, optionally containing chlorine atoms, while x is 1 or 2. Said transfer agents can be selected, for example, from: $CF_2I_2$, $I(CF_2)_6I$, $I(CF_2)_4I$, $CF_2ClI$, $CF_3CFICF_2I$, and the like. For the iodine introduced as chain end group by addition of iodinated chain transfer agents as above mentioned see for example U.S. Pat. Nos. 4,243,770 and 4,943,622.

It is also possible to use as chain transfer agents alkaline or alkaline-earth metal iodides, according to what described in the patent application EP 407,937.

In combination with the chain transfer agents containing iodine, other known chain transfer agents of the prior art, such as ethyl acetate, diethylmalonate, etc., can be used.

The iodine amount in end position of the (per)fluoroelastomer is generally between 0.001% and 3%, preferably between 0.01% and 1% by weight with respect to the fluoroelastomer weight. See U.S. Pat. Nos. 4,035,565 and 4,694,045.

Furthermore the (per)fluoroelastomers curable by peroxidic way can contain, alternatively or in combination with iodine, also bromine, both in the chain and in end position. The bromine in the chain can be introduced by using a cure-site comonomer according to known techniques; see for example U.S. Pat. Nos. 4,035,565, 4,745,165, EP 199,138; or as end bromine as described in U.S. Pat. No. 4,501,869.

The (per)fluoroelastomers of the invention are TFE polymers with at least one perfluorinated olefin having one unsaturation of ethylene type. In particular the comonomers are selected from:
(per)fluoroalkylvinylethers (PAVE) $CF_2=CFOR_{2f}$, wherein $R_{2f}$ is a $C_1$-$C_6$ (per)fluoroalkyl, for example trifluoromethyl, bromotrifluoromethyl, pentafluoropropyl;
(per)fluorooxyalkylvinylethers $CF_2=CFOX_0$, wherein $X_0$ is a $C_1$-$C_{12}$ perfluorooxyalkyl, containing one or more ether groups, for example perfluoro-2-propoxy-propyl;
(per)fluorovinylethers called MOVE having general formula:

$$CFX_2=CX_2OCF_2OR''_f \quad \text{(I-B)}$$

wherein
$R''_f$ has the following meanings:
$C_1$-$C_6$ linear or branched (per)fluoroalkyl,
$C_5$-$C_6$ cyclic (per)fluoroalkyl,
$C_2$-$C_6$ linear or branched (per)fluorooxyalkyl containing from one to three oxygen atoms,
$X_2$=F, H.

When in the (per)fluoroelastomers the comonomer is a (per)fluorovinylether of formula (I-B), it is preferably selected from the following:

$CF_2=CFOCF_2OCF_2CF_3$ (MOVE1)

$CF_2=CFOCF_2OCF_2CF_2OCF_3$ (MOVE2)

$CF_2=CFOCF_2OCF_3$ (MOVE3).

Preferred monomeric compositions for curable (per)fluoroelastomers are the following, expressed in % by moles:
TFE 50-85%, PAVE 15-50%;
TFE 20-85%, MOVE 15-80%, optionally PAVE 0-50%;
the sum of the monomers being 100% by moles.

The (per)fluoroelastomers used in the (per)fluoroelastomeric compositions of the present invention can optionally contain also units deriving from VDF, $C_3$-$C_8$ fluoroolefins, optionally containing hydrogen atoms, chlorine and/or bromine and/or iodine, $C_2$-$C_8$ non fluorinated olefins (OI), preferably ethylene and/or propylene. Examples of compositions of these (per)fluoroelastomers are the following 33-75% by moles of tetrafluoroethylene (TFE), preferably 40-60%; 15-45% by moles of a perfluorovinylether (PAVE), preferably 20-40%; 2-25% by moles of vinylidene fluoride (VDF), preferably 15-20%;

TFE 32-60%, PAVE 20-40%; OI 10-40%;
the sum of the composition moles being 100%.

As preferred perfluorovinylethers PAVE, (per)fluoromethylvinylether, perfluoroethylvinylether, perfluoropropylvinylether can be mentioned.

In the above mentioned (per)fluoroelastomeric compositions, at the place or in combination with the vinylethers PAVE, the (per)fluorovinylethers of formula (I-B) can be used, with the proviso that the total % of the vinylethers is within the limits indicated above for the above mentioned compositions containing PAVE.

The (per)fluoroelastomers can contain also monomeric units in the chain deriving from small amounts of a bis-olefin of the above reported general formula (I), as described in U.S. Pat. No. 5,585,449, generally the bis-olefin amount in the (per)fluoroelastomer ranges from 0.01% to 5% by moles with respect to the polymer.

To the curable compound other components can optionally be added, for example the following:
a metal compound, in an amount comprised between 0 and 15% by weight with respect to the polymer, selected from divalent metal oxides or hydroxides, such as for example Mg, Zn, Ca or Pb, optionally associated to a weak acid salt, as stearates, benzoates, carbonates, oxalates or phosphites of Ba, Na, K, Pb, Ca;
other conventional additives, as reinforcing fillers, pigments, antioxidants, stabilizers and the like. Among fillers, carbon black, barium sulphate, silicates, semicrystalline (per)fluoropolymers, for example selected between PTFE or PTFE modified with comonomers, can be mentioned.

The curable perfluoroelastomers contain the perfluoroelastomer and the curing agents.

The (per)fluoroelastomers of the invention, as said, are cured by peroxidic way. This is carried out according to known techniques, by addition of peroxides capable to generate radicals by heating. Among the most commonly used there are: dialkylperoxides, as for example di-terbutyl-peroxide and 2,5-dimethyl-2,5-di(terbutylperoxy)hexane; dicumyl peroxide; dibenzoyl peroxide; diterbutyl perbenzoate; di[1,3-dimethyl-3-(terbutylperoxy) butyl]-carbonate. Other peroxidic systems are described, for example, in the patent applications EP 136,596 and EP 410,351.

Generally the amount of peroxide used ranges from 0.1% to 5%, preferably from 0.2% to 3% by weight with respect to the polymer weight.

The preparation of the (per)fluoroelastomers of the present invention can be carried out by copolymerization of the monomers in aqueous emulsion according to well known methods of the prior art, in the presence of radical initiators (for example alkaline or ammonium persulphates, perphosphates, perborates or percarbonates), optionally with ferrous or silver salts, or other easily oxidizable metals. Surfactants, as for example (per)fluoroalkylic carboxylates or sulphonates (for example ammonium perfluorooctanoate) or (per)fluoropolyoxyalkylenic, or others known in the prior art are also present in the reaction medium.

At the end of the polymerization, the fluoroelastomer is isolated from the emulsion by conventional methods, as coagulation by addition of electrolytes or by cooling.

Alternatively, the polymerization reaction can be carried out in mass or in suspension, in an organic liquid wherein a suitable radical initiator is present, according to well known techniques.

The polymerization reaction is generally carried out at temperatures in the range of 25° C.-150° C., under pressure up to 10 MPa.

The preparation of the fluoroelastomers of the present invention is preferably carried out in aqueous emulsion in the presence of an emulsion, dispersion or microemulsion of perfluoropolyoxyalkylenes, according to what described in U.S. Pat. Nos. 4,789,717 and 4,864,006, which are herein incorporated by reference.

Optionally the (per)fluoroelastomers of the invention can be mixed with semicrystalline (per)fluoropolymers in an amount (% by weight referred to the total dry weight (per)fluoroelastomer+semicrystalline (per)fluoropolymer) from 0% to 70%, preferably from 0% to 50% by weight, still more preferably from 2% to 30% by weight. With semicrystalline (per)fluoropolymer it is meant a (per)fluoropolymer showing, besides the glass transition temperature Tg, at least a crystalline melting temperature. The semicrystalline (per)fluoropolymer is constituted by tetrafluoroethylene (TFE) homopolymers, or TFE copolymers with one or more monomers containing at least one unsaturation of ethylene type, in an amount from 0.01% to 10% by moles, preferably from 0.05% to 7% by moles.

Said comonomers having an ethylene unsaturation are of both hydrogenated and fluorinated type. Among the hydrogenated ones, ethylene, propylene, acrylic monomers, for example methylmethacrylate, (meth)acrylic acid, butylacrylate, hydroxyethylhexylacrylate, styrene monomers, can be mentioned.

Among fluorinated comonomers it can be mentioned:
$C_3$-$C_8$ perfluoroolefins, as hexafluoropropene (HFP), hexafluoroisobutene;
$C_2$-$C_8$ hydrogenated fluoroolefins, as vinyl fluoride (VF), vinylidene fluoride (VDF), trifluoroethylene, perfluoroalkylethylene $CH_2=CH-R_f$, wherein $R_f$ is a $C_1$-$C_6$ perfluoroalkyl;
$C_2$-$C_8$ chloro- and/or bromo- and/or iodo-fluoroolefins, as chlorotrifluoroethylene (CTFE);
(per)fluoroalkylvinylethers (PAVE) $CF_2=CFOR_f$, wherein $R_f$ is a $C_1$-$C_6$ (per)fluoroalkyl, for example $CF_3$, $C_2F_5$, $C_3F_7$; (per)fluoro-oxyalkylvinylethers $CF_2=CFOX$, wherein X is: a $C_1$-$C_{12}$ alkyl, or a $C_1$-$C_{12}$ oxyalkyl, or a $C_{1012}$ (per)fluoro-oxyalkyl having one or more ether groups;
(per)fluorodioxoles, preferably perfluorodioxoles.

PAVEs, in particular perfluoromethyl-, perfluoroethyl-, perfluoropropylvinylether and (per)fluorodioxoles, preferably perfluorodioxoles, are preferred comonomers.

Optionally the semicrystalline (per)fluoropolymer is coated by a shell of a semicrystalline (per)fluoropolymer containing bromine and/or iodine atoms in the chain deriving from brominated and/or iodinated comonomers, in an amount from 0.1% to 10% by moles referred to the total moles of the basic monomeric units of the semicrystalline (per)fluoropolymer core+shell, the semicrystalline (per)fluoropolymer in the core and in the shell can be of different composition. See EP 1,031,606.

The preparation of said semicrystalline (per)fluoropolymers is carried out by polymerization of the monomers in aqueous emulsion in the presence of an emulsion, dispersion or microemulsion of perfluoropolyoxyalkylenes, according to what described in U.S. Pat. Nos. 4,789,717 and 4,864,006. Preferably the synthesis is carried out in the presence of a perfluoropolyoxyalkylene microemulsion.

When the (per)fluoroelastomers of the present invention contain semicrystalline (per)fluoropolymers, mixing is preferably carried out by mixing in the desired ratios the (per)fluoroelastomer latex with the semicrystalline (per)fluoropolymer latex, then co-coagulating the obtained mixture as described in U.S. Pat. Nos. 6,395,834 and 6,310,142.

Alternatively the semicrystalline (per)fluoropolymer can be polymerized and then the (per)fluoroelastomer is polymerized on the (per)fluoropolymer particles. A core-shell structure is thus obtained.

The Applicant has unexpectedly and surprisingly found that, by using as filler the carbon black as defined above in the (per)fluoroelastomers of the invention, an improved vapour resistance at high temperatures, for example from 230° C. up to 320° C., in particular from 250° C. up to 300° C., is obtained, this means a combination of good sealing properties, measured by the compression set, and limited variations of the mechanical properties, as stress at break, elongation at break, hardness and swelling by volume. This combination of good sealing properties and of limited variation of mechanical properties is maintained even after long times of vapour treatment at the above mentioned high temperatures, for example for treatment times higher than 150 hours.

A further object of the present invention are the (per)fluoroelastomeric compositions curable according to the present invention to obtain manufactured articles showing an improved vapour resistance at high temperatures, from 230° C. to 320° C., in particular from 250° C. to 300° C., even for long treatment times, even higher than 150 hours.

An object of the present invention are also cured (per)fluoroelastomeric compositions obtainable from the curable compositions of the invention.

A further object of the present invention are cured manufactured articles obtainable from the curable (per)fluoroelastomeric compositions of the invention.

In order to obtain the manufactured articles the known techniques of the prior art are used, for example the compression molding can be mentioned. As said, the (per)fluoroelastomeric compositions of the present invention can be used in the chemical industry, in particular when vapour resistances at high temperatures, for example from 230° C. to 320° C., in particular from 250° C. to 300° C. are required. This means a combination of good sealing properties (compression set) and low variations of the mechanical properties after vapour treatment at the above mentioned high temperatures, even for long times, for example even higher than 150 hours are obtained. In particular the (per)fluoroelastomeric compositions of the present invention unexpectedly and surprisingly show an improved combination of the above mentioned properties even after vapour treatment at the mentioned high temperatures. The properties, maintained at high levels, are the mechanical properties, in particular stress at break, hardness and swelling by volume and the sealing properties, as shown by the compression set. In particular the compositions of the invention can also be used in the food and pharmaceutical field.

The following Examples are given for illustrative and not limitative purposes of the present invention.

EXAMPLES

Methods
Determination of the Surface Area CTAB of the Carbon Black

The determination is carried out as described in the ASTM D 3765 standard. CTAB stands for cetyltrimethylammonium bromide which is used in the determination.

Example 1

Polymerization

In a 22 litre steel autoclave, equipped with stirrer working at 460 rpm there have been introduced, after evacuation, 14.5 litres of demineralized water and 145 ml of a microemulsion obtained by mixing:

32 ml of a perfluoropolyoxyalkylene having average molecular weight 600 g/mole, having acid end group of formula:

$$CF_2ClO(CF_2-CF(CF_3)O)_n(CF_2O)_mCF_2COOH$$

wherein n/m=10;

32 ml of an aqueous solution of NH$_3$ at 30% by volume;
62 ml of demineralized water;
19 ml of Galden® D02 having average molecular weight of 450 g/mole and formula:

$$CF_3O(CF_2-CF(CF_3)O)_n(CF_2O)_mCF_3$$

wherein n/m=20.

The autoclave was then heated to 80° C. and maintained at said temperature for the whole time of the reaction. Then 35 g of 1,4-diiodoperfluorobutane (C$_4$F$_8$I$_2$) were introduced in the autoclave.

The mixture of monomers having the following molar composition was then fed:
tetrafluoroethylene (TFE) 35%;
perfluoromethylvinylether (MVE) 65%;
so as to bring the pressure to 25 bar relative (rel) (2.5 MPa).
In the autoclave there are then introduced:
0.7 g of ammonium persulphate (APS) as initiator;
18 g of bis-olefin of formula CH$_2$=CH—(CF$_2$)$_6$—CH=CH$_2$.

The bis-olefin addition was carried out in 20 portions, each of 0.9 g, starting from the polymerization beginning and for every 5% increase in the monomer conversion.

The pressure of 25 bar rel (2.5 MPa) was maintained constant for the whole duration of the polymerization by feeding a mixture having the following molar composition: tetrafluoroethylene (TFE) 60%, perfluoromethylvinylether (MVE) 40%.

After 160 minutes of reaction, corresponding to 100% of monomer conversion, the autoclave was cooled and the latex discharged.

The so obtained latex had a concentration equal to 290 g$_{polymer}$/kg$_{latex}$ and was used both in the Examples of the invention and in the comparative Examples.

The latex was coagulated by dripping it in a nitric acid solution. The obtained polymer is dried at 90° C. in an air-circulating oven for 16 hours.

The dried polymer was mixed with the following ingredients:

bis-olefin, having formula CH$_2$=CH—(CF$_2$)$_6$—CH=CH$_2$;
2,5-dimethyl-2,5-di(terbutylperoxy)hexane Luperox®101 XL45;
carbon black, as indicated in the examples;
optionally other fillers;
in the amounts (phr) indicated in Table 1 for the examples according to the invention and for the comparative ones.

The so obtained blend was molded for 10 minutes at 170° C. and then characterized under the conditions indicated in Table 1.

In Table 1:
Carbon black N774 indicates a carbon black having a surface area CTAB equal to 33 m$^2$/g;
Carbon black N990 indicates a carbon black having a surface area CTAB equal to 7 m$^2$/g;
Carbon black N550 indicates a carbon black having a surface area CTAB equal to 42 m$^2$/g;
Carbon black N326 indicates a carbon black having a surface area CTAB equal to 83 m$^2$/g;
Carbon black N772 indicates a carbon black having a surface area CTAB equal to 33 m$^2$/g.

From the data of Table 1 it is noticed that the (per)fluoroelastomeric compositions according to the present invention show a high vapour resistance, since the variations of stress at break and of volume are very limited compared with those of the comparative examples. Furthermore the compression set of the examples of the invention is clearly lower than that of the comparative examples.

TABLE 1

| Composition in phr | Surface area | Ex. 2 | Ex. 3 | Ex. 4 comp | Ex. 5 comp | Es. 6 comp |
|---|---|---|---|---|---|---|
| Polymer ex. 1 |  | 100 | 100 | 100 | 100 | 100 |
| bis-olefin |  | 1.5 | 1.5 | 1.5 | 1.5 | 1.5 |
| Luperox ® 101 XL45 |  | 1.5 | 1.5 | 1.5 | 1.5 | 1.5 |
| ZnO |  | 5 | 5 | 5 | 5 | 5 |
| Carbon black N774 | 33 | 15 | — | — | — | — |
| Carbon black M990 | 7 | — | — | 15 | — | — |
| Carbon black N550 | 42 | — | — | — | 10 | — |
| Carbon black N326 | 83 | — | — | — | — | 7 |
| Carbon black N772 | 33 | — | 15 | — | — | — |
| Mechanical properties after post-treatment: 8 hours of gradient + 16 hours at 290° C. (ASTM D573) | | | | | | |
| Stress at break (MPa) |  | 20.4 | 21 | 14 | 18.5 | 17.9 |
| Elongation at break (%) |  | 162 | 150 | 286 | 200 | 190 |
| Hardness (Shore A) |  | 70 | 70 | 68 | 71 | 68 |

|  | Ex. 2 | Ex. 3 | Ex. 4 comp | Es. 5 comp | Es. 6 comp |
|---|---|---|---|---|---|
| Chemical treatment in vapour/water 168 hours at 275° C. | | | | | |
| Δ% Stress at break | −8 | −7 | −55 | −57 | −53 |
| Δ% Elongation at break | +31 | +25 | +30 | +35 | +30 |
| Δ% Hardness (Shore A) | +2 | +2 | +5 | +5 | +5 |
| Δ% Volume | +3 | +2 | +7 | +7 | +8 |
| Compression set (%) 70 h at 200° C. ASTM D395 method B | 52 | 51 | 67 | 62 | 62 |

The invention claimed is:
1. A method of making manufactured articles having resistance to vapour at high temperatures, of fluoroelastomeric or perfluoroelastomeric compositions curable by peroxidic way, comprising combining for 100 phr of fluoroelastomer or perfluoroelastomer:
as filler, from 2 to 70 phr of carbon black having surface area CTAB (ASTM D 3765) between 25 and 35 m$^2$/g;
as crosslinking agent, from 0.5 to 10 phr of a bis-olefin having general formula;

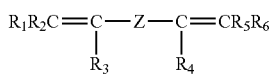

wherein:
$R_1, R_2, R_3, R_4, R_5, R_6$, equal to or different from each other, are H or $C_1$-$C_5$ alkyls;
Z is selected between a $C_1$-$C_{18}$ linear or branched alkylene or cycloalkylene radical, optionally containing oxygen atoms, or a fluoropolyoxyalkylene or perfluoropolyoxyalkylene radical.

2. The method according to claim 1, wherein in the (per)fluoroelastomeric fluoroelastomeric or perfluoroelastomeric composition the carbon black ranges from 5 to 50 phr.

3. The method according to claim 1, wherein in the fluoroelastomeric or perfluoroelastomeric composition the bis-olefin ranges from 0.6 to 5 phr.

4. The method according to claim 1, wherein in formula (I) Z is a $C_4$-$C_{12}$, perfluoroalkylene radical and $R_1, R_2, R_3, R_4, R_5, R_6$ are hydrogen; when Z is a fluoropolyoxyalkylene or perfluoropolyoxyalkylene radical, it comprises units selected from the following —$CF_2CF_2O$—, —$CFX_1O$—, —$CF_2$—$CH_2CH_2O$—, and —$C_3F_6O$—, wherein $X_1$=F, $CF_3$.

5. The method according to claim 4, wherein Z has formula:

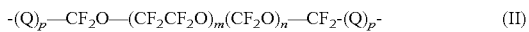

wherein: Q is a $C_1$-$C_{10}$ alkylene or oxyalkylene radical; p is 0 or 1; m and n are numbers such that the m/n ratio is between 0.2 and 5 and the molecular weight of said fluoropolyoxyalkylene or perfluoropolyoxyalkylene radical is in the range 300-10,000.

6. The method according to claim 5, wherein Q is selected from:

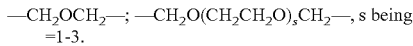

7. The method according to claim 4, wherein the bis-olefin has formula:

wherein t0 is an integer from 6 to 10.

8. The method according to claim 1, wherein the fluoroelastomers or perfluoroelastomers contain peroxidic crosslinking sites.

9. The method according to claim 8, wherein peroxidic crosslinking sites are iodine and/or bromine atoms.

10. The method according to claim 8, wherein the iodine and/or bromine amount is between 0.001% and 5% by weight, with respect to the total weight of the polymer.

11. The method according to claim 8, wherein in the fluoroelastomers or perfluoroelastomers the iodine and/or bromine atoms are in the chain and/or in end position.

12. The method according to claim 8, wherein the fluoroelastomers or perfluoroelastomers are TFE copolymers with at least one per-fluorinated olefin having one unsaturation of ethylene type.

13. The method according to claim 12, wherein in the fluoroelastomers or perfluoroelastomers the comonomer is selected from:
fluoroalkylvinylethers or perfluoroalkylvinylethers (PAVE) $CF_2$=$CFOR_{2f}$, wherein $R_{2f}$ is a $C_1$-$C_6$ fluoroalkyl or perfluoroalkyl;
fluoro-oxyalkylvinylethers or perfluoro-oxyalkylvinylethers $CF_2$=$CFOX_0$, wherein $X_0$ is a $C_1$-$C_{12}$ perfluorooxyalkyl, containing one or more ether groups;
fluorovinylethers or perfluorovinylethers (MOVE) having general formula:

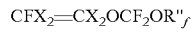

wherein
R"f has the following meanings:
$C_1$-$C_6$ linear or branched fluoroalkyl or perfluoroalkyl,
$C_5$-$C_6$ cyclic (per)fluoroalkyl or perfluoroalkyl,
$C_2$-$C_6$ linear or branched fluorooxyalkyl or perfluorooxyalkyl containing from one to three oxygen atoms,
$X_2$=F, H.

14. The method according to claim 12, wherein the fluoroelastomers or perfluoroelastomers have the following compositions, expressed as % by moles:
TFE 50-85%, PAVE 15-50%;
TFE 20-85%, MOVE 15-80%, optionally PAVE 0-50%;
the sum of the monomers being 100% by moles.

15. The method according to claim 12, wherein the fluoroelastomers or perfluoroelastomers contain units deriving from VDF, $C_3$-$C_8$ fluoroolefins, optionally containing hydrogen atoms, chlorine and/or bromine and/or iodine, $C_2$-$C_8$ non fluorinated olefins (OI).

16. The method according to claim 15, wherein the fluoroelastomers or perfluoroelastomers have the following compositions:
33-75% by moles of tetrafluoroethylene (TFE), 15-45% by moles of a perfluorovinylether (PAVE), 2-25% by moles of vinylidene fluoride (VDF);
TFE 32-60%, PAVE 20-40%; OI 10-40%;
the sum of the moles of the compositions being 100%.

17. The method according to claim 1, wherein the fluoroelastomeric or perfluoroelastomeric composition comprises other components selected from:
a metal compound, in an amount between 0% and 15% by weight with respect to the polymer, selected from divalent metal oxides or hydroxides optionally associated to a weak acid salt;
reinforcing fillers, pigments, antioxidants, stabilizers.

18. The method according to claim 17, wherein the reinforcing fillers are selected from barium sulphate, silicates, semicrystalline fluoropolymers or perfluoropolymers.

19. The method according to claim 1, wherein the fluoroelastomers or perfluoroelastomers are in admixture with a semicrystalline fluoropolymer or perfluoropolymer in an amount, as per cent by weight referred to the total dry weight (per)fluoroelastomer+semicrystalline fluoropolymer or perfluoropolymer, from 0% to 70%.

20. The method according to claim 19, wherein the semicrystalline fluoropolymer or perfluoropolymer is constituted by tetrafluoroethylene (TFE) homopolymers, or TFE copolymers with one or more monomers containing at least one unsaturation of ethylene type, in an amount from 0.01% to 10% by moles, said comonomers with one ethylene unsaturation being both of hydrogenated and fluorinated type.

21. The method according to claim 19, wherein the hydrogenated comonomers are selected from ethylene, propylene, acrylic monomers, styrene monomers.

22. The method according to claim 19, wherein the fluorinated comonomers are selected from the following:
$C_3$-$C_8$ perfluoroolefins;
$C_2$-$C_8$ hydrogenated fluoroolefins; perfluoroalkylethylene $CH_2$=$CH$—$R_f$, wherein $R_f$ is a $C_1$-$C_6$ perfluoroalkyl;
$C_2$-$C_8$ chloro- and/or bromo- and/or iodo-fluoroolefins;
fluoroalkylvinylethers or perfluoroalkylvinylethers (PAVE) $CF_2$=$CFORf$, wherein $R_f$ is a $C_1$-$C_6$ (per)fluoroalkyl;

fluoro-oxyalkylvinylethers or perfluoro-oxyalkylvinylethers $CF_2$=CFOX, wherein X is a $C_1$-$C_{12}$ alkyl, or a $C_1$-$C_{12}$ oxyakyl, or a $C_1$-$C_{12}$ (per)fluoro-oxyalkyl or (per)fluoro-oxyalkyl having one or more ether groups; (per)fluorodioxoles, preferably perfluorodioxoles.

23. Fluoroelastomeric or perfluoroelastomeric compositions according to claim 1.

24. Manufactured articles obtainable from the curable (per) fluoroelastomeric compositions according to claim 1.

25. Cured fluoroelastomeric or perfluoroelastomeric compositions obtainable from the curable fluoroelastomeric or perfluoroelastomeric compositions according to claim 1.

* * * * *